Feb. 27, 1973    C. J. SCHNEIDER, JR    3,718,070
EXPENDABLE LAUNCHER MUNITION
Filed April 23, 1971                7 Sheets-Sheet 1

INVENTOR
Clayton J. Schneider, Jr.

BY  Harry M. Saragovitz
    Edward J. Kelly
    Herbert Berl
    Bernard J. Ohlendorf
                ATTORNEYS INVENTOR
Clayton J. Schneider, Jr.

Harry M. Saragovitz
Edward J. Kelly
Herbert Berl
Bernard J. Ohlendorf

BY ATTORNEYS

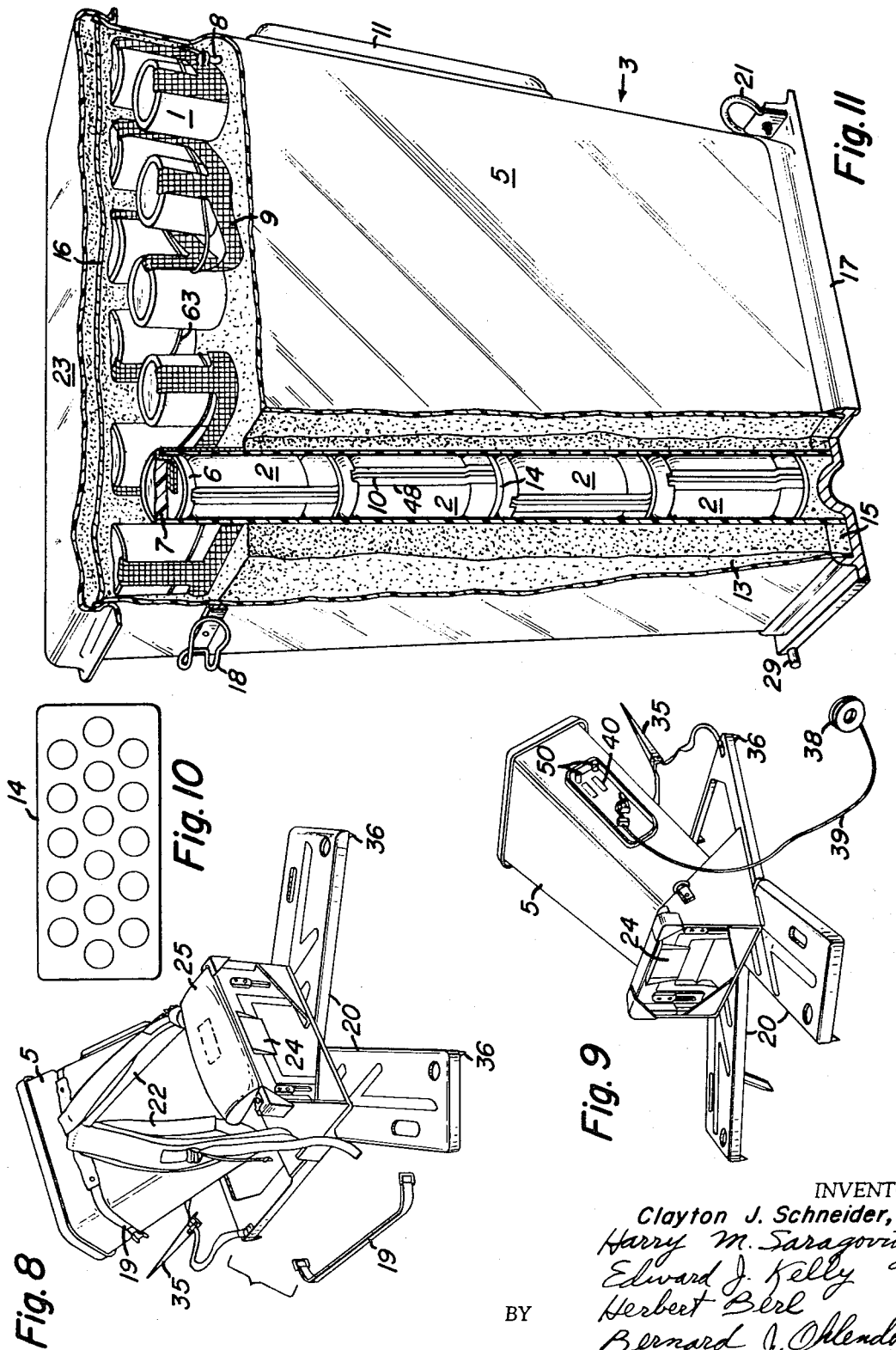

Feb. 27, 1973   C. J. SCHNEIDER, JR   3,718,070
EXPENDABLE LAUNCHER MUNITION
Filed April 23, 1971   7 Sheets-Sheet 4
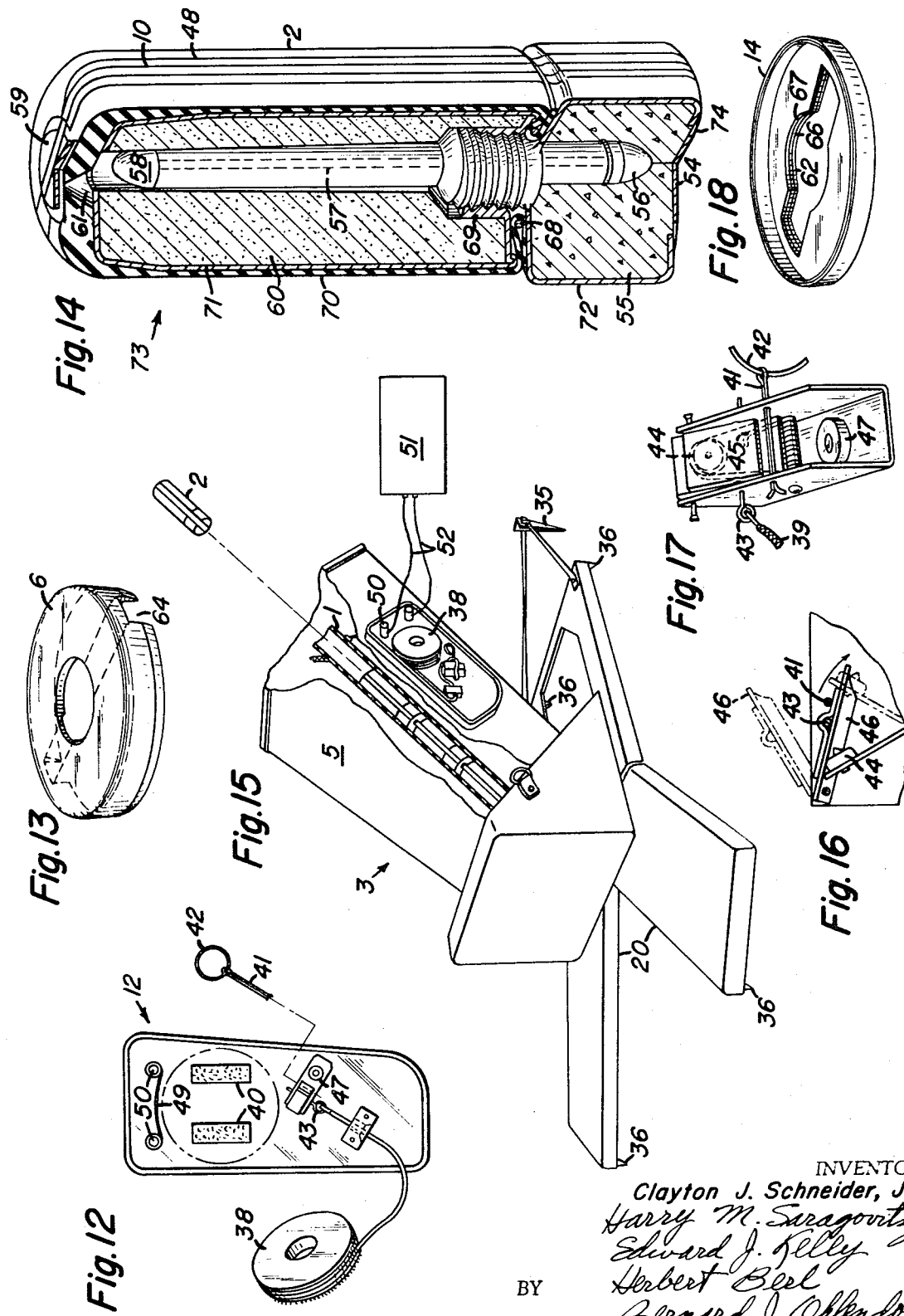
INVENTOR
Clayton J. Schneider, Jr.
Harry M. Saragovitz
Edward J. Kelly
Herbert Beel
Bernard J. Ohlendorf
BY
ATTORNEYS

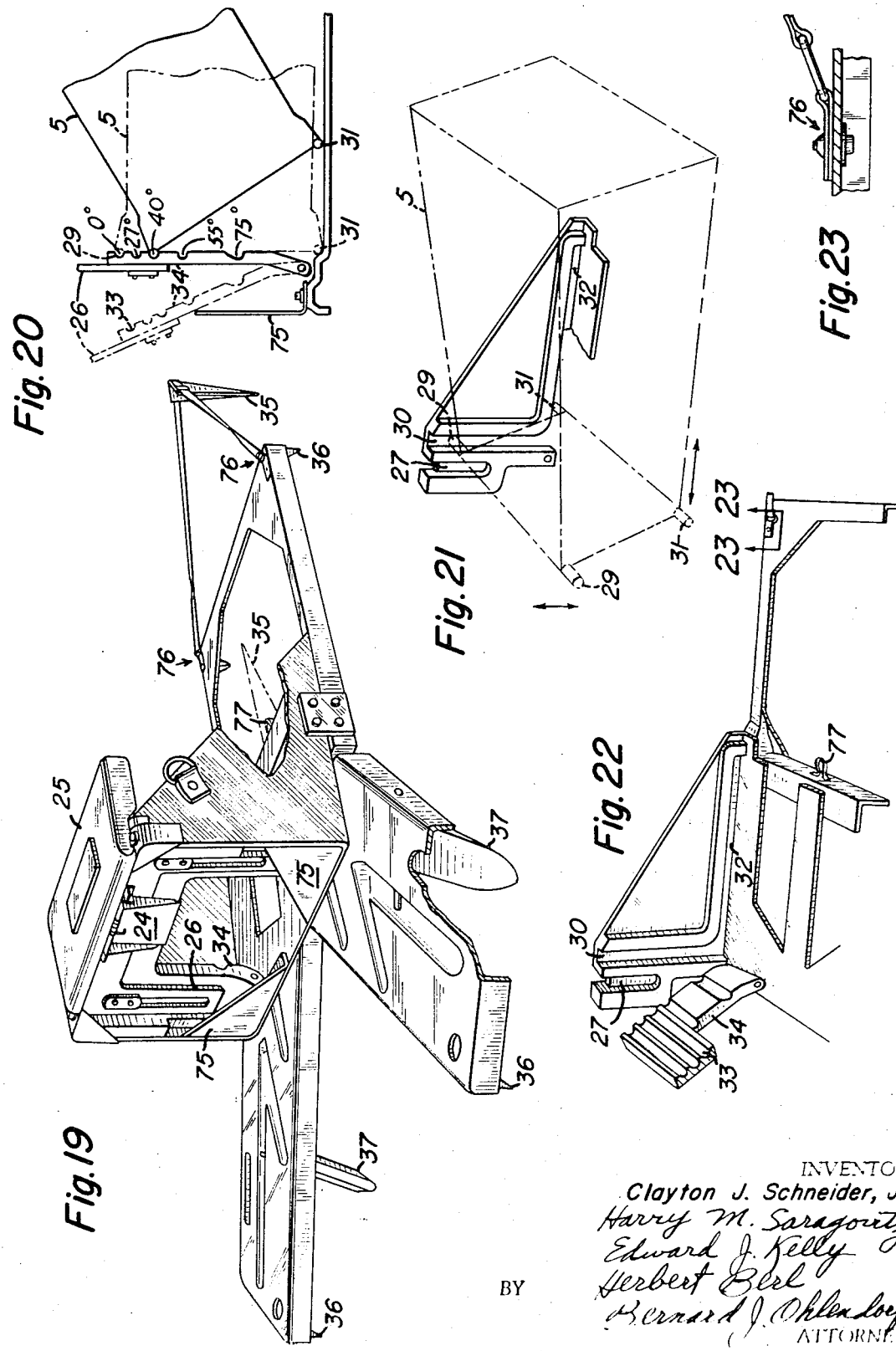

Feb. 27, 1973 C. J. SCHNEIDER, JR 3,718,070
EXPENDABLE LAUNCHER MUNITION
Filed April 23, 1971 7 Sheets-Sheet 6

INVENTOR
Clayton J. Schneider, Jr.
Harry M. Saragovitz
Edward J. Kelly
Herbert Berl
BY Bernard J. Ohlendorf
ATTORNEYS

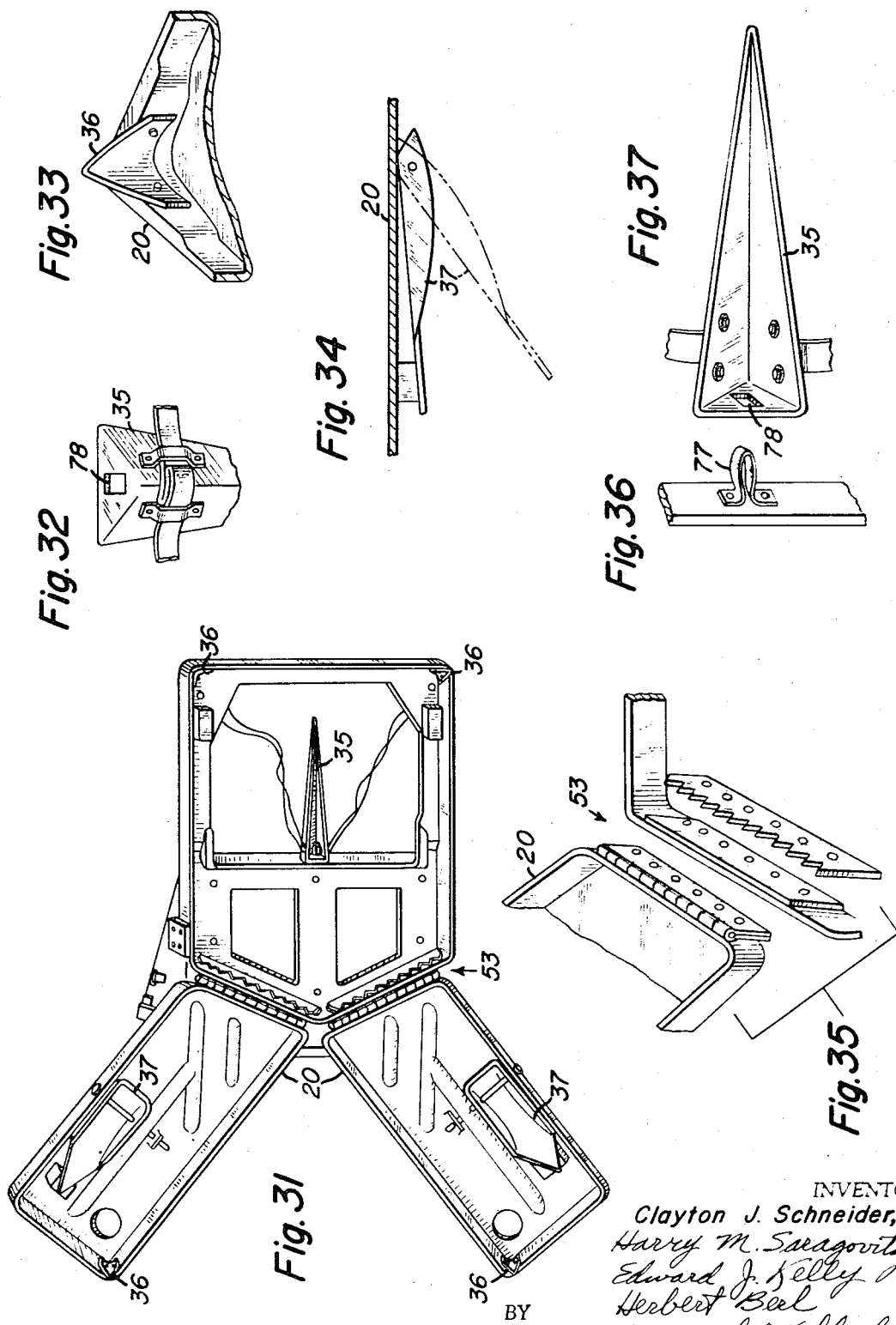

United States Patent Office 3,718,070
Patented Feb. 27, 1973

3,718,070
EXPENDABLE LAUNCHER MUNITION
Clayton J. Schneider, Jr., East Aurora, N.Y., assignor to the United States of America as represented by the Secretary of the Army
Filed Apr. 23, 1971, Ser. No. 136,695
Int. Cl. F41f 3/04
U.S. Cl. 89—1.8                3 Claims

ABSTRACT OF THE DISCLOSURE

An apparatus and method for launching munitions to a target site from an expendable launching means. The expendable launcher is designed so it is not capable of being re-used.

DEDICATORY CLAUSE

The invention described herein may be manufactured, used, and licensed by or for the Government for governmental purposes without the payment to me of any royalty thereon.

SPECIFICATION

My invention relates to a new method and apparatus for launching munitions to a target site by an expendable launching means.

A problem has long existed to provide a means to launch munitions to target sites which was economical to manufacture, which could be left in the field after the munition is launched without the possibility of being re-used by an enemy force, which could be easily and readily transported on the back of a single operator to a firing site, and which could be activated at the firing site by a single operator to launch a plurality of munitions to a target site. My invention was conceived and reduced to practice to solve the aforementioned problem and to satisfy the long felt need for an expendable munition launching means.

A principal object of my invention is to provide an expendable launching means for munitions which is economical to manufacture and which cannot be re-used.

Another object of my invention is to provide an expendable launching means for munitions which can be easily and readily transported to a firing site by a single operator and which can be fired by a single operator to launch a plurality of munitions to a target site.

Other objects of my invention will be obvious or will appear from the specification hereinafter set forth.

FIG. 8 is a view of my launching means in firing position at a selected quadrant elevation.

FIG. 9 is a view of FIG. 8 showing the firing well with the firing lanyard means removed from the well.

FIG. 10 is a plan view showing an exemplary arrangement of munitions within a common breech plate of my launching means.

FIG. 11 is a cutaway view showing the munitions and assembly within my launching means.

FIG. 12 is a view of the firing well and well components of my launching means.

FIG. 13 is a view showing the top cover for each munition for my launching means.

FIG. 14 is a cutaway view of the munition for my launching means.

FIG. 15 is a utility view of my launching means showing a munition being launched to a target site.

FIG. 16 is a view showing the operation of the striker point of the firing means of my launcher means.

FIG. 17 is a view of the firing means of my launcher means.

FIG. 18 is a view of the bottom cover means for each munition for my launching means.

FIG. 19 is a view showing the frame assembly of my launching means.

FIG. 20 is a detailed view showing the process of quadrant elevation selection and fixing of my launching means.

FIG. 21 is a view showing the side positioning means for quadrant elevation.

FIG. 22 is a view showing the rear positioning means for quadrant elevation of my launching means.

FIG. 23 is a view through 23—23 of FIG. 22 of a swivel carrying strap joint of my launching means.

FIG. 31 is a bottom view of FIG. 4.

FIG. 32 is a fragment view of the front mounting prong of my launching means; the prong being shown in FIG. 19 described above and FIG. 37 described below.

FIG. 33 is a view of the corner ground mounting prong fixed to the base of my launching means.

FIG. 34 is a view of the movable ground mounting prong fixed to the base of my launching means.

FIG. 35 is a detailed view of the base hinge assembly for my launching means; the gross hinge assembly being shown in FIG. 31 described above.

FIG. 36 is a view of the keeper means for retaining the front ground mounting prong in the stored position during transport of my launching means to a firing site.

FIG. 37 is a view of the front ground mounting prong for my launching means.

My invention and FIGS. 1 to 37 will now be described in detail as follows.

Figure 1:
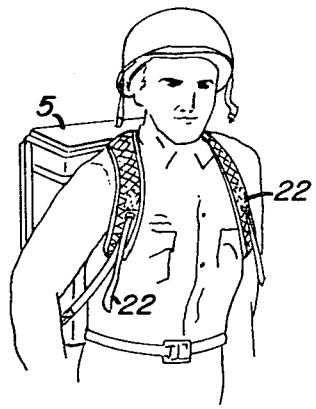
FIG. 1 is a view of my launching means being transported to a firing site.
Figure 2:
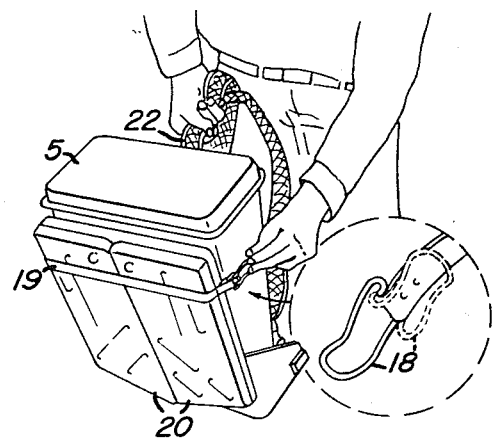
FIG. 2 is a view of my launching means in the process of having the base released by opening a quick release catch which locks the base securing strap in position.

While any number and arrangement of tubes 1, as shown in FIG. 11, containing any number of munitions, shown at 2 as in FIG. 14, can be used with my launching means, shown at 3 as in FIG. 15, within the skill of the art to suit a given application; I imbedded 16 tubes 1 in breech plate 4, as shown in FIG. 10, and I loaded each tube 1 with four munitions 2, as shown in FIG. 11. In the stored position, as shown in the cutaway view in FIG. 11, my launching means comprises a plastic case 5 to house the munition assembly, tube means 1 to contain munitions 2, munitions 2 within base means 5 to be launched to a target site, flanged separator cap 6 for each munition 2 to function as a cover means, foam cap 7 for each munition 2 to function as a tube closure means, conventional electrical squib means 8 to ignite fuze train 9 which in turn ignites fuze strip 10 integral with train 9, firing well cover 11 to cover the firing components housed in the firing well shown at 12 in FIG. 12, polyurethane foam potting material 13 to anchor tubes 1 within case 5, cardboard separator 14 located between each munition 2 to separate the plurality of munitions, base 15 made of epoxy resin, metal foil vapor barrier 16, base plate 17, quick release catch 18 to hold restraining strap 19 as shown in FIG. 2 and retain base projections 20 in a closed position as shown in FIG. 2, attachment ring 21 fixedly connected to base plate 17 for connection thereto of carrying harness 22 as shown in FIG. 1, and top cover 23 as a closure means for launching means 3. To transport my launching means to a firing site, it is merely strapped on the back of an operator, as shown in FIG. 1, in knapsack fashion. Alternatively, my launching means could also be removably mounted on a vehicular device for transport purposes or for employment from the vehicle.

Figure 3:
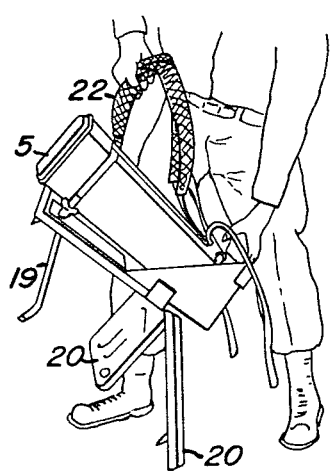
FIG. 3 is a view of my launching means with the base released and in the process of being placed on the ground to assume a firing position.
Figure 4:
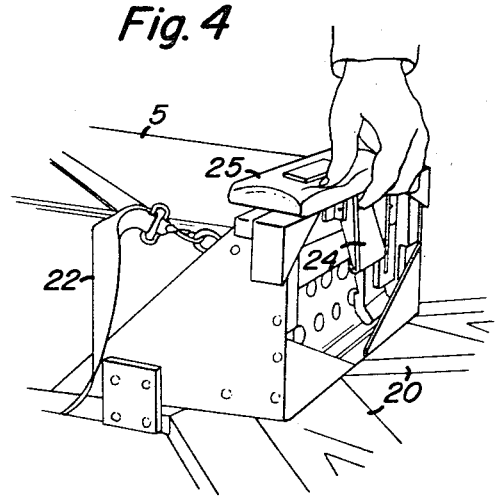
FIG. 4 is a view of my launching means in the process of having the locking mechanism latch disengaged.
Figure 5:
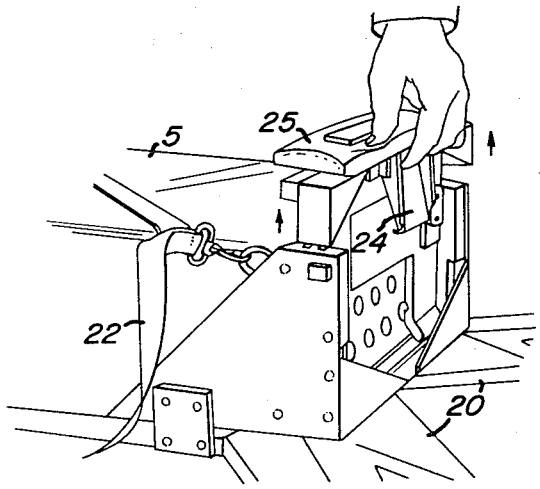
FIG. 5 is a view of my launching means in the process of having the locking mechanism disengaged to permit quadrant elevation selection.
Figure 6:
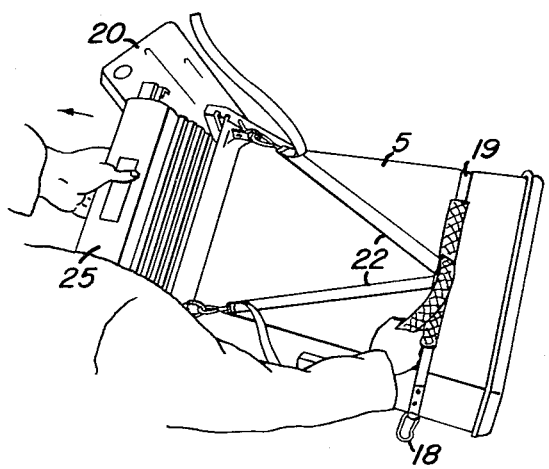
FIG. 6 is a view of my launching means in the process of quadrant elevation selection.
Figure 7:
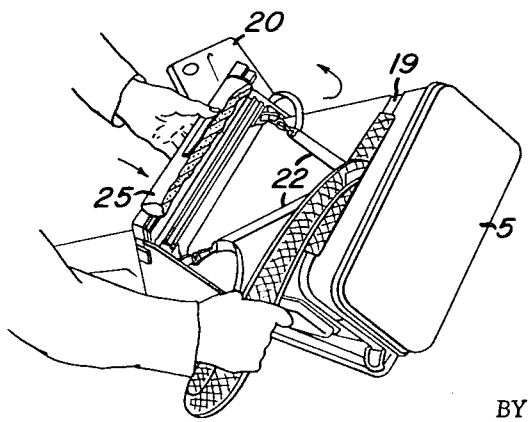
FIG. 7 is a view of my launching means being locked in position by the latch described in FIG. 4 after quadrant elevation selection.
Figure 26:
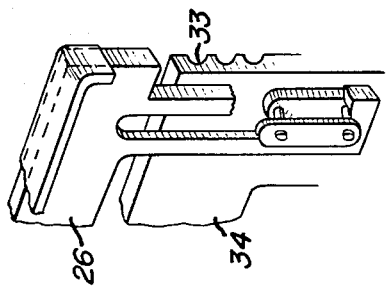
FIG. 26 is a detailed view showing the means for operating the back rest of my launching means from a closed to an open position and vice versa.
Figure 30:
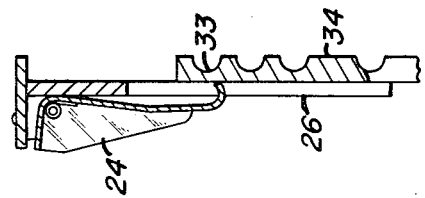
FIG. 30 is a detailed view of the latch means of FIG. 4 in the open or unlatched position as in FIG. 25.
Figure 29:
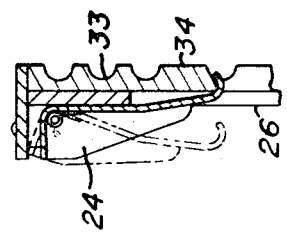
FIG. 29 is a detailed view of the latch means of FIG. 4 in the closed or latched position as in FIG. 24.
Figure 25:
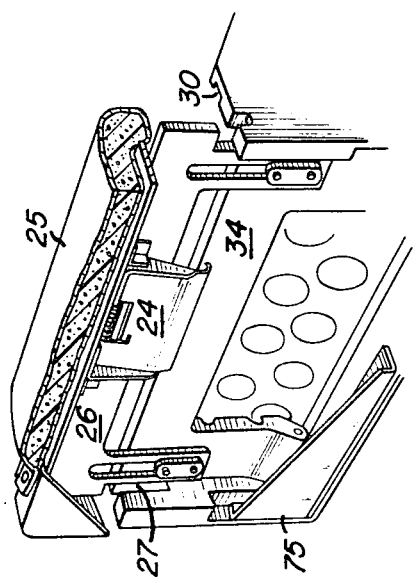
FIG. 25 is a view showing the back rest of my launching means in the open position.
Figure 28:
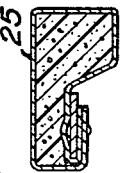
FIG. 28 is a sectional view of the back rest assembly for my launching means.
Figure 27:
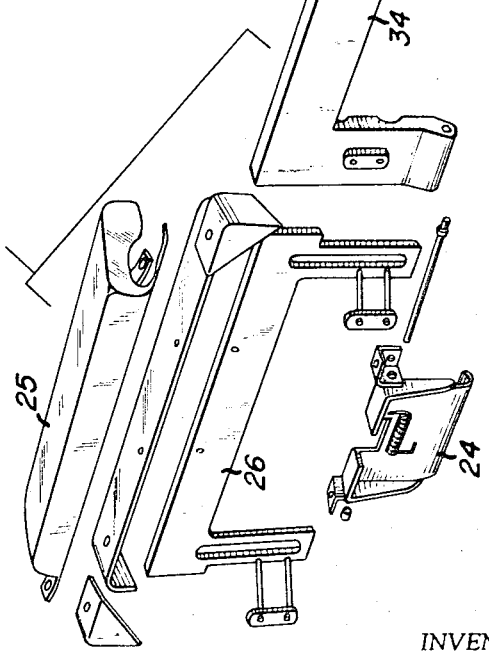
FIG. 27 is an exploded view of FIGS. 24, 25, and 26.
Figure 24:
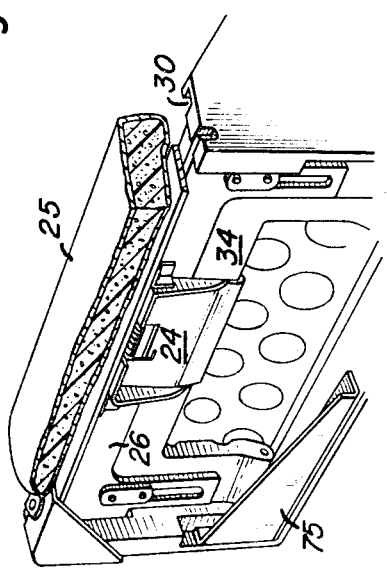
FIG. 24 is a view showing the back rest of my launching means in the closed position for transporting my launching means.

To utilize my launching means after transport to a firing site, as shown in FIG. 1, catch 18 is released as shown in FIG. 2 to permit base projections 20 to be released from the stored position by hinge means 53, as shown in FIGS. 31 and 35, to be placed, as shown in FIG. 3, in the open position shown in FIG. 4. Launching means 3 is placed on the ground in the position shown in FIG. 4 after base projections 20 have been released, and locking mechanism latch 24 is depressed, as shown in FIG. 4, to permit back rest 25 to be raised, as shown in FIGS. 5, 24, 25, 26, 29, and 30. After locking back rest 25 in the raised position, as shown in FIG. 30, which removes extensions 26 from slots 27, launcher means 3 is free to be placed in a desire elevation quadrant through moving rod 29 in vertical track 30 and rod 31 in horizontal track 32 and while placing rod 29 in the appropriate elevation slot 33 of position plate 34 and rotating position plate 34 to an inclined position which is limited in travel by stop means 75, as shown in FIGS. 20 and 21; the tracks and position plate being most clearly shown in FIG. 22. As shown in FIG. 20, firing can be accomplished at quadrant elevations of 90°, 75°, 55°, 40°, 27°, and 0°, but at 0° an auxiliary support is required for the munition. Elevation slots 33 are each marked in an appropriate manner to readily determine the degree of elevation provided, such as numerical or color code marking. Launching means 3 is held firmly on the ground for firing by inserting front prong 35, corner prongs 36, and movable prong 37 firmly into the ground, the prongs being structurally shown in FIG. 19. Prongs 35 and 37 are stored when not in use, as shown in FIG. 31, with prong 35 being stored by inserting keeper 77 in hole 78, as shown in FIGS. 36 and 37. Prong 35 is attached to the base of the launcher by swivel joint means 76, as shown in FIG. 23. After selection of the quadrant elevation position as described above and shown in FIGS. 6 and 8, the elevation position is locked in for firing as shown in FIGS. 7, 25, and 29. To fire launching means 3, lanyard reel 38, as shown in FIGS. 9, 12, and 15, is removed from firing well 12 and lanyard 39 unwound from reel 38. Reel 38 can be removably mounted within well 12 in any conventional and convenient manner, such as adhesive strips 40, as shown in FIG. 12. After removal of lanyard reel 38, safety pin 41 is withdrawn, as shown in FIG. 12, by pulling on ring 42 in the conventional manner to withdraw pin 41 from the safe position shown in FIG. 17. After removal of safety pin 41, tension is applied to lanyard 39 to remove lanyard pin 43 shown in FIGS. 12 and 17 which permits striker point 44 to rotate in a clockwise direction as a result of tension imparted by spring 45 to force striker point hold down 46 in a counterclockwise direction, as shown in FIG. 16. Striker point 44 strikes and detonates conventional primer 47, shown in FIG. 17, to ignite a conventional pyrotechnic delay mix, not shown in the drawing. Ignition of the delay mix in turn ignites fuze train 9 which in turn ignites pyrotechnic disc 59 and fuze strip 10 under lead foil tape 48, as shown in FIGS. 11 and 18. Fuze train 9 is anchored in place under foam cap 7, as shown in FIG. 11. Alternatively, the above mechanical primer ignition can be replaced by electrical squib 8 ignition, squib 8 being ignited by removing shorting bar 49, as shown in FIG. 12, from binding posts 50 and connecting an electrical source, such as battery 51, to binding posts 50 by leads 52, as shown in FIG. 15. Flash from ignited squib 8 ignites fuze train 9 as described above regarding the primer ignition means. Another squib, not shown in the drawing, is provided at the opposite end of launcher 3 from squib 8, shown in FIG. 11, and the squibs are connected by a powder train to provide the ignition sequence subsequently described. An extra auxiliary fuze train 63 can be provided as ignition insurance to supplement fuze train 9. Ignition of fuze strip 10 by pyrotechnic disc 59 in turn ignites pyrotechnic pad 54 which ignites black powder 55 which ignites conventional first fire coating 56 which ignites conventional time delay fuze 57 which ignites conventional igniter coating 58 which ignites any predetermined and suitable payload 60 such as a mixture of conventional lacrymatory and pyrotechnic material, conventional smoke mix, conventional incendiary mix, or a conventional explosive mix, as shown in FIG. 14. Lacquer diaphragm 74 is coated over pad 54 to provide water proofing, as shown in FIG. 14. Ignited payload 60 is expelled through orifice nozzle 61 which in addition to discharging the payload imparts skittering and gyrating along the ground to munition 2 due to the thrust produced; such skittering and girating producing a spreading of the area of effects at the target site. In order to balance rotational moments, ignition sequencing of the pattern of tubes 1, as shown in FIGS. 10 and 11, is arranged so that tubes 1 are discharged in pairs from the outer to the inner groups of tubes, and ignition timing is predetermined so that one pair of tubes is discharged before another pair has begun to discharge to reduce recoil levels. Top cover 62, as shown in FIG. 13 and bottom cover 14, as shown in FIG. 18, are provided for each munition 2; cover 62 being provided with notch 64 to fit over fuze strip 10. Cover 14 consists of three layers; namely, aluminum foil layer 62, paper layer 66, and paper layer 67, as shown in FIG. 18. Tubes 1, cover 62, and cover 14 are made of soft materials to achieve non-reloadability after use, such as paper or plastic. Payload sections 73 of munition 2 is connected to propellant cup section 72 through metal adapter means 69, as shown in FIG. 14. Payload 60 is enclosed in metal case 71 and a rubber case 70 surrounds case 71; case 70 being snugly retained around case 71 by wire means 68, as shown in FIG. 14. While my launcher 3 is described for use with base projections 20, it can also be used without a support means. When used without a support means, it is necessary to have an inclinometer integral with the launcher means to set the elevation quadrant.

It is obvious that other modifications can be made of my invention, and I desire to be limited only by the scope of the appended claims.

I claim:

1. An expendable munition launching apparatus adapted to be mounted on a support means for firing and adapted to deliver a munition means to a target site, the apparatus comprising a case means adapted to contain at least one container means for housing at least one munition means; at least one container means located within the case means, the container means being adapted to contain at least one munition means and being made of a soft material; at least one munition means located within the container means; means to select a predetermined quadrant elevation of the apparatus for launching the munition means to the target site; means to discharge the munition means from the container means and to deliver the munition means to the target site; and means to discharge a payload within the munition means from the munition at the target site and wherein the munition means comprises a payload section adapted to contain a payload for delivery to a target site; a propellant cup section adapted to contain a propellant material adapted to discharge the munition means from the apparatus; an adapter means to connect the payload section to the propellant cup section; a time delay fuze means mounted within the adapter means and extending longitudinally through the propellant cup section and the payload section, the delay fuze means being adapted to activate an igniter coating at a predetermined time for discharge of the payload at the target site; a first fire coating integral with the end of the delay fuze within the propellant cup section, the first fire coating being adapted to be activated by the propellant material and to activate the delay fuze; a pyrotechnic pad integral with the bottom of the propellant cup section, the pyrotechnic pad being adapted to be activated by a first fuze train means and to activate the propellant material; a lacquer diaphragm superimposed on the side of the pyrotechnic pad external to the munition means, the diaphragm being adapted to insure a water proof seal; a pyrotechnic disc integral with the end of the munition opposite to the pyrotechnic pad, the pyrotechnic disc being adapted to be activated by a second fuze train means which is ignited by an initiator means, the pyrotechnic disc means being adapted to activate the first fuze train means; a first fuze train means connecting the pyrotechnic pad and disc means to activate the pad means subsequent to activation of the disc means; an igniter coating integral with the end of the delay fuze located within the payload section, the igniter coating being adapted to be activated by the delay fuze and to activate the payload; a lead foil tape means superimposed on the first fuze train means to insure a waterproof seal; a payload surrounding the delay fuze; a rubber enclosure means surrounding the payload, the rubber enclosure means being secured to the adapter means by a wire means to effect a closure and being adapted to be ruptured on activation of the payload to permit discharge of the payload; a metal shell means surrounding the rubber enclosure means to give rigidity to the payload section; and a nozzle means formed in the shell means adjacent to the igniter coating, the nozzle means being adapted to permit discharge of any fluid payload and chemical reaction product.

2. The apparatus of claim 1 wherein a plurality of the munition means are located within the container means; the propellant material is black powder; the delay fuze means is threadably mounted within the adapter means; the initiator means is a squib means adapted to be activated by an electrical energy source; and the payload is a material selected from the group of materials consisting of incendiary material, explosive material, and chemical agent material.

3. The apparatus of claim 1 wherein the initiator means is a primer means adapted to be activated by a firing mechanism; the firing mechanism comprising a striker means adapted to activate the primer means, a safety pin means adapted to maintain the striker means in an unarmed position prior to firing the munition means from the apparatus, a lanyard pin means adapted to permit activation of the striker means upon removal of the lanyard pin means, and a lanyard means to remove the lanyard pin means to activate the striker means.

References Cited

UNITED STATES PATENTS

| | | | |
|---|---|---|---|
| 3,319,522 | 5/1967 | Gould et al. | 89—1.816 X |
| 3,137,231 | 6/1964 | Johnson | 102—34.4 |
| 1,580,344 | 4/1926 | Stillians | 89—1.815 X |
| 3,048,086 | 8/1962 | Robert et al. | 89—1.817 |
| 2,229,208 | 1/1941 | Holm et al. | 102—39 |
| 2,771,818 | 11/1956 | Lauritsen | 89—1.815 |
| 3,198,072 | 8/1965 | Bengelmann | 89—1.815 |
| 3,199,406 | 8/1965 | Gould | 89—1.816 X |
| 3,451,306 | 6/1969 | Lagerstrom et al. | 89—1 R |

FOREIGN PATENTS

| | | | |
|---|---|---|---|
| 1,941,597 | 3/1970 | Germany | 89—1.815 |

SAMUEL W. ENGLE, Primary Examiner

U.S. Cl. X.R.

89—1.813, 1.815, 1.817, 37 L